No. 628,453. Patented July 11, 1899.
A. W. DELANE.
CHAINLESS CYCLE.
(Application filed Mar. 22, 1898.)
(No Model.) 2 Sheets—Sheet 1.
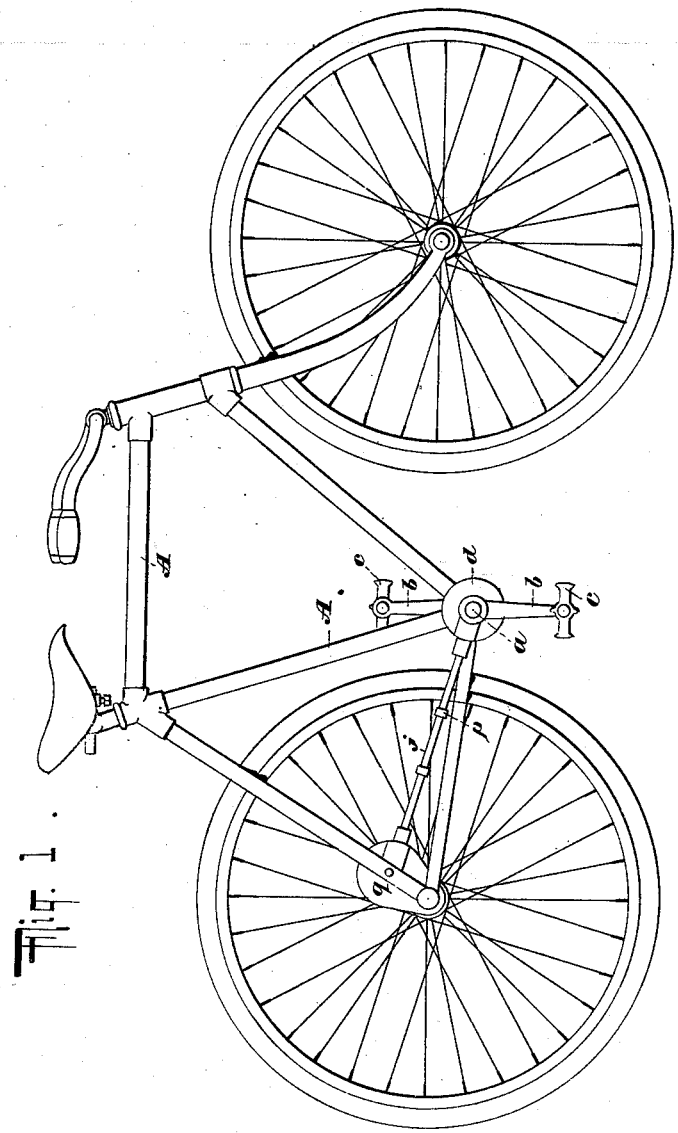
WITNESSES:
INVENTOR
Anson W. Delane
BY Briesen & Knauth
ATTORNEYS No. 628,453. Patented July 11, 1899.
A. W. DELANE.
CHAINLESS CYCLE.
(Application filed Mar. 22, 1898.)
(No Model.) 2 Sheets—Sheet 2.
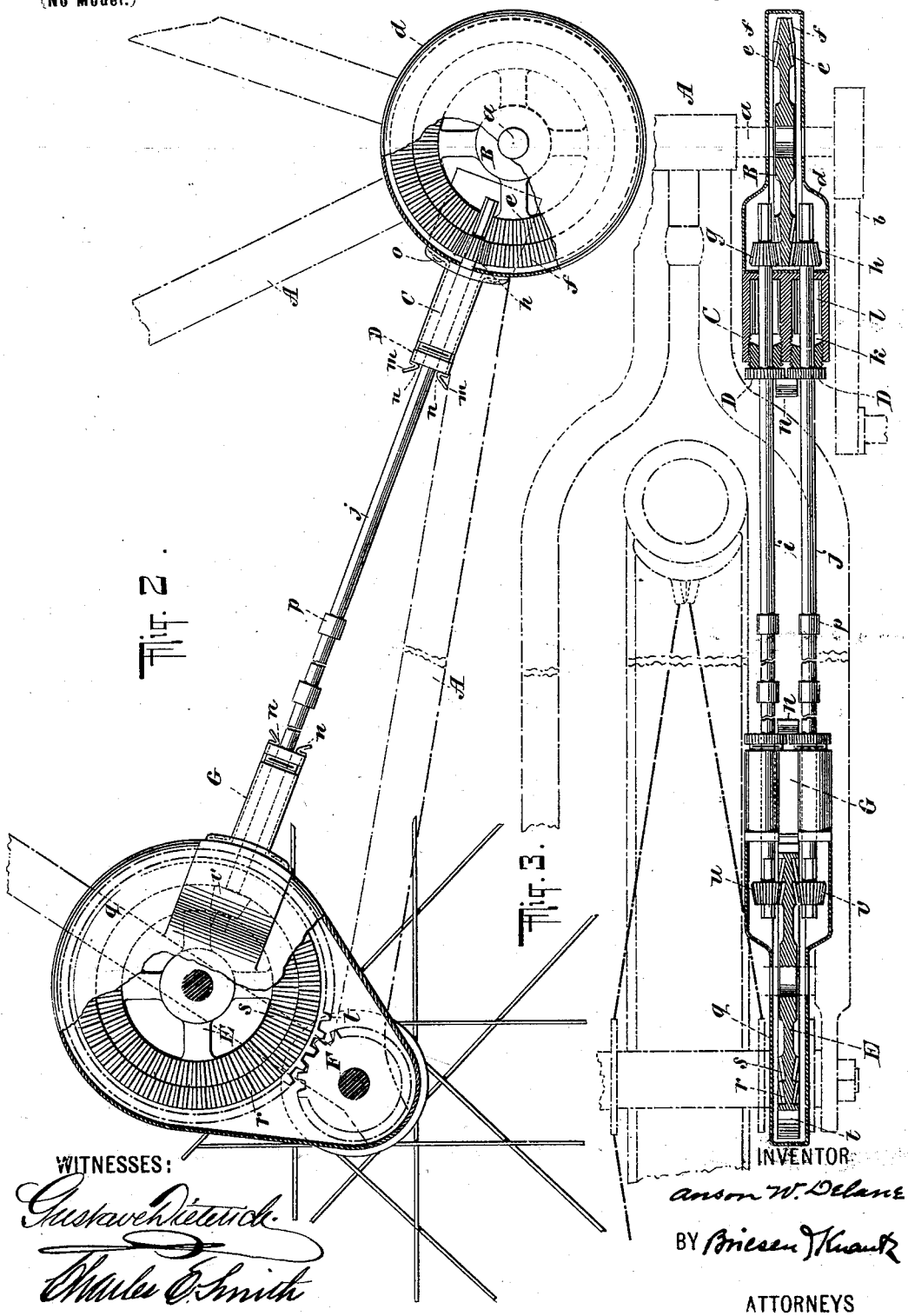
WITNESSES:
INVENTOR
Anson W. Delane
BY
ATTORNEYS

United States Patent Office.

ANSON W. DELANE, OF NEW YORK, N. Y., ASSIGNOR, BY DIRECT AND MESNE ASSIGNMENTS, OF ONE-HUNDRED-AND-FIFTY-ONE TWO-HUNDREDTHS TO JEREMIAH A. SCRIVEN, OF SAME PLACE.

CHAINLESS CYCLE.

SPECIFICATION forming part of Letters Patent No. 628,453, dated July 11, 1899.

Application filed March 22, 1898. Serial No. 674,717. (No model.)

*To all whom it may concern:*

Be it known that I, ANSON W. DELANE, residing in the borough of Manhattan, in the city, county, and State of New York, have invented certain new and useful Improvements in Chainless Cycles, of which the following is a specification.

My invention relates to cycles, and is more particularly adapted for bicycles; and the primary object of said invention is to provide an efficient chainless cycle.

A further object of my invention is to provide for changing the gear in a cycle of the character specified.

To these ends my invention consists in the novel arrangement and combination of parts hereinafter described and claimed.

In the accompanying drawings, wherein like characters indicate corresponding parts, Figure 1 represents a side view of a bicycle embodying my invention. Fig. 2 is an enlarged fragmentary detail side view, with parts broken away, of the power-transmitting mechanism constituting the subject-matter of my invention. Fig. 3 is a plan view of the same, partly in section.

In Fig. 1 of the drawings, A represents an ordinary diamond frame of a bicycle, which is provided with a crank-shaft $a$, to which are secured the usual cranks $b$, carrying pedals $c$. To the crank $a$ is fixed what I term a "toothed" driving-gear B, (see Fig. 2,) which is contained within a suitable housing or casing $d$ and is provided with two or more concentric beveled gear-faces $e f$ upon opposite sides or faces of the gear. Coöperating with either set of these beveled sections $e f$ are pinions $g h$, which are carried upon power-transmitting shafts $i j$ and are adapted to bear upon opposite sides of the driving-gear B, preferably at diametrically opposite points, as illustrated in Fig. 3. The power-transmitting shafts $i j$ pass through openings contained in the bearing C, said bearing comprising two cylindrical chambers $k$, which are adapted to contain antifriction balls or rollers $l$, against which the power-transmitting shafts $i j$ are adapted to bear. These rollers are confined within their cylindrical chambers by screw-sleeves D, through which pass power-transmitting shafts $i j$. It will be seen that by this arrangement the antifriction balls or rollers $l$ are maintained in proper position in the bearing and prevent dust from passing to the interior of the bearing C. This bearing C is adapted to slide longitudinally upon the power-transmitting shafts $i j$ when the retaining-springs $m$ are spread apart in opposite directions, thereby releasing the nose $n$ on each of these springs from engagement with the sleeves D of the bearing, it being understood, of course, that the springs $m$ are secured to the casing $d$, as indicated at $o$, and are immovable in a longitudinal direction. An abutment or collar $p$ is provided upon each of the power-transmitting shafts $i j$ to limit the movement of the bearing C thereon. Adjacent to the rear or driven traction-wheel of the cycle I mount a casing or housing $q$, which is similar to the housing $d$. Within this housing is contained what I term a "driven" toothed gear-wheel E, similar to the gear B, except that in addition to the beveled gear-sections $r s$ upon opposite faces thereof I provide a gear $t$ upon the edge or periphery of said wheel, which is adapted to engage the pinion F, which is connected to the driven wheel of the cycle. This gear-wheel E has coöperating pinions $u v$, carried by the power-transmitting shafts $i j$, and is likewise provided with a bearing G, all of which parts are similar in every respect to the corresponding parts at the opposite ends of the power-transmitting shafts.

When it is desired to change the gear of the cycle, it is merely necessary to force the two longitudinally-movable bearings C G toward each other upon the power-transmitting shafts until they are brought into engagement with the abutments or collars thereon, when the shafts may be shifted in a longitudinal direction in the following manner.

Assuming the parts to be in the position illustrated in Fig. 3 and that it is desired to change the gear of the cycle, it is merely necessary to shift the bearings, as in the manner before stated, and to slightly spring the power-transmitting shafts $i j$, so as to release the pinions u v from engagement with the shoulder constituting a portion of the gear-faces r. The shafts may then be moved in a longitudinal direction, when the pinions g h will ride upon the beveled gear portion f of the driving-gear B and will engage the beveled portion e of the gear. The bearings may then be moved back into the initial positions, thereby firmly maintaining the pinions g h u v in engagement with the portions r e of the gear-wheels E and B, respectively.

It will be observed that by my invention the beveled pinions on the power-transmitting shafts engage the gear-wheels upon opposite sides and counterbalance the tendency of lateral thrust of either of said power-transmitting shafts. In other words, the beveled pinions u v and g h on the shafts operate upon opposite faces of the gear-wheels E and B, respectively, and the roller-bearings constitute connections between the shafts, so that they are immovable laterally with relation to each other. For this reason any tendency of lateral thrust upon one shaft will be exerted upon the other shaft to make its beveled gear bear with greater force against the coöperating face of the gear-wheel. It will be understood, however, that, in fact, there is no greater stress upon one side than upon the other and that the tendency of lateral thrust is the same upon both sides of the gear-wheels, but that such thrust is counterbalanced by the means described. It will likewise be seen that the power-transmitting shafts and their coöperating parts are mounted upon one side of the driven traction-wheel of the cycle.

Having described my invention, what I claim, and desire to secure by Letters Patent, is—

1. In a cycle, the combination of a driving gear-wheel having teeth on opposite faces thereof a driven gear-wheel likewise having teeth on opposite faces thereof, a plurality of shafts provided with pinions engaging opposite faces of the driving and driven gears and serving to transmit power from one gear to the other, and a plurality of bearings each normally embracing the shafts at or near the ends thereof so as to prevent the adjacent ends of the shafts from spreading apart under the stress of operation, the said bearings being freely movable longitudinally upon the shafts so as to be slid away from the ends of the shafts to allow the ends of the shafts to be spread apart to effect a change of the gear.

2. In a cycle the means for driving the same comprising a double-faced toothed driving-gear B, a similar driven gear E, a pair of substantially parallel shafts i j each provided with a pinion to engage a driving and driven gear, the said shafts being located on opposite sides or faces of the said gears and gearing therewith, a plurality of bearings each embracing both shafts at or near their ends and freely movable longitudinally on said shafts as and for the purpose set forth and a gear for transmitting motion from the driven gear to the traction-wheel of the cycle.

3. In a cycle, the combination of traction-wheels, a driving-gear, a driven gear, longitudinally-shiftable power-transmitting shafts for transmitting motion to said traction-wheels, said shafts having pinions which are adapted to engage at two or more points upon opposite sides of said gears, a roller-bearing longitudinally movable upon and forming a connection between said shafts so that they are immovable laterally with relation to each other, rollers contained within said bearing and against which the shafts are adapted to bear, and means for maintaining the roller-bearings in the operative position.

4. In a cycle, the combination of a driving-gear provided with two concentric beveled sections upon each side thereof, a driven gear provided with two concentric beveled sections upon each side thereof, intermediate longitudinally-shiftable power-transmitting shafts having pinions which are adapted to engage upon opposite sides of the gears, two roller-bearings longitudinally movable upon and forming a connection between said shafts, so that they are immovable laterally with relation to each other when the bearing is in the operative position, rollers contained within said bearings and against which the shafts are adapted to bear and means for maintaining said bearings against movement when in the operative position.

5. In a cycle, the combination of a driving-gear provided with two concentric beveled sections upon each side thereof, a driven gear provided with two concentric beveled gear-sections upon each side thereof, intermediate longitudinally-shiftable power-transmitting shafts having pinions which are adapted to engage upon opposite sides of said gears, two roller-bearings carried by and longitudinally movable upon and forming a connection between said shafts, so that they are immovable laterally with relation to each other when said bearings are in the operative position, cylindrical chambers contained within said bearings through which the shafts are adapted to project, a screw-head D for each of said chambers, rollers contained within the chambers and against which rollers the shafts are adapted to bear and spring-catches for maintaining said bearings against movement when the parts are in the operative position.

ANSON W. DELANE.

Witnesses:
CHARLES E. SMITH,
GEO. E. MORSE.